(12) United States Patent
Kullik

(10) Patent No.: US 11,525,533 B2
(45) Date of Patent: Dec. 13, 2022

(54) PIPE DEVICE HAVING A BONDED JOINT

(71) Applicant: NORMA Germany GmbH, Maintal (DE)

(72) Inventor: Sven Kullik, Langenselbold (DE)

(73) Assignee: Norma Germany GmbH, Maintal (DE)

( * ) Notice: Subject to any disclaimer, the term of this patent is extended or adjusted under 35 U.S.C. 154(b) by 53 days.

(21) Appl. No.: 16/643,674

(22) PCT Filed: Aug. 27, 2018

(86) PCT No.: PCT/EP2018/073038
§ 371 (c)(1),
(2) Date: Mar. 2, 2020

(87) PCT Pub. No.: WO2019/042944
PCT Pub. Date: Mar. 7, 2019

(65) Prior Publication Data
US 2020/0269517 A1 Aug. 27, 2020

(30) Foreign Application Priority Data

Sep. 4, 2017 (DE) .......................... 102017120305.2

(51) Int. Cl.
*F16L 47/02* (2006.01)
*F16L 33/34* (2006.01)
(Continued)

(52) U.S. Cl.
CPC .............. *F16L 33/34* (2013.01); *B29C 66/13* (2013.01); *F16L 13/0209* (2013.01);
(Continued)

(58) Field of Classification Search
CPC .......... B29C 65/0672; B29C 66/12441; B29C 66/13; F16L 13/0209; F16L 25/0036;
(Continued)

(56) References Cited

U.S. PATENT DOCUMENTS 2,172,532 A * 9/1939 Fentress .............. F16L 33/2073
285/259
2,216,686 A * 10/1940 Fentress .............. F16L 33/2073
285/256
(Continued)

FOREIGN PATENT DOCUMENTS

CN 1788177 A 6/2006
DE 19927431 A1 * 12/2000 .............. F16L 47/02
(Continued)

OTHER PUBLICATIONS

Chinese Office Action for Chinese Application No. 201880054748.6 dated Mar. 3, 2021 (4 pages).
(Continued)

*Primary Examiner* — Zachary T Dragicevich
*Assistant Examiner* — James A Linford
(74) *Attorney, Agent, or Firm* — Reising Ethington, P.C.

(57) ABSTRACT

A pipe device includes a pipe and a connection element. The pipe has a pipe jacket that has an inner surface and an outer surface and forms a flow channel. The connection element forms a through-channel that extends from a connection piece consisting of a first material (M1) and having a first opening to a second opening. The pipe jacket is positioned on the connection piece with a first pipe end consisting of a second material (M2). A bonded connection is formed between the first material (M1) and the second material (M2) in a contact region between the inner surface of the pipe jacket and a peripheral surface of the connection piece.

10 Claims, 3 Drawing Sheets

(51) Int. Cl.
*F16L 13/02* (2006.01)
*F16L 13/10* (2006.01)
*B29C 65/00* (2006.01)
*F16L 25/00* (2006.01)
*B29C 65/06* (2006.01)
*B29L 31/24* (2006.01)

(52) U.S. Cl.
CPC ......... *F16L 13/103* (2013.01); *F16L 25/0036* (2013.01); *F16L 47/02* (2013.01); *B29C 65/0672* (2013.01); *B29C 66/12441* (2013.01); *B29L 2031/24* (2013.01)

(58) Field of Classification Search
CPC ......... F16L 33/34; F16L 47/02; F16L 13/007; B29L 2031/24
See application file for complete search history.

(56) References Cited

U.S. PATENT DOCUMENTS

| | | | | |
|---|---|---|---|---|
| 4,094,537 | A | * | 6/1978 | Lyall .................. F16L 47/02 285/55 |
| 5,499,439 | A | * | 3/1996 | Zaborszki ............ F16L 33/00 228/136 |
| 6,199,916 | B1 | | 3/2001 | Klinger et al. |
| 6,832,785 | B1 | | 12/2004 | Zitkovic, Jr. |
| 6,902,208 | B1 | * | 6/2005 | Mobley .................. B29C 65/02 285/331 |
| 8,109,688 | B2 | | 2/2012 | Hattass et al. |
| 10,935,171 | B1 | * | 3/2021 | Nakano ............... F16L 19/0206 |
| 2002/0145284 | A1 | * | 10/2002 | Powell ................ F16L 25/0036 285/353 |
| 2004/0090065 | A1 | * | 5/2004 | Furuta ..................... F16L 33/26 285/256 |
| 2004/0094953 | A1 | * | 5/2004 | Luft ...................... F16L 33/222 285/256 |
| 2007/0075543 | A1 | | 4/2007 | Marx et al. |
| 2007/0095467 | A1 | * | 5/2007 | Stieler ................. B29C 66/5344 156/273.9 |
| 2007/0222214 | A1 | | 9/2007 | Klinger |
| 2007/0284878 | A1 | * | 12/2007 | Duquette ................ F16L 19/04 285/10 |
| 2008/0012309 | A1 | | 1/2008 | Blivet et al. |
| 2010/0301596 | A1 | | 12/2010 | Amann et al. |
| 2013/0263960 | A1 | * | 10/2013 | Cichorek ................ F16L 9/133 138/140 |
| 2016/0089529 | A1 | * | 3/2016 | Bolz ..................... F16L 13/103 285/119 |
| 2016/0363242 | A1 | * | 12/2016 | De Nora ................ B29C 48/09 |

FOREIGN PATENT DOCUMENTS

| | | | | |
|---|---|---|---|---|
| DE | 10322090 | A1 | | 12/2004 |
| DE | 69823351 | T2 | | 3/2005 |
| DE | 69921187 | T2 | * | 2/2006 ............. F16L 21/03 |
| DE | 102004046797 | A1 | | 4/2006 |
| DE | 102008017922 | A1 | | 1/2009 |
| DE | 102010030718 | A1 | | 1/2012 |
| EP | 0402843 | A2 | * | 12/1990 |
| EP | 1503128 | A2 | | 2/2005 |
| EP | 1640141 | A2 | | 3/2006 |
| EP | 1503128 | A3 | | 5/2006 |
| EP | 3379125 | A1 | * | 9/2018 ......... B29C 65/0672 |
| JP | H07301374 | A | | 11/1995 |
| JP | 2001263570 | A | * | 9/2001 ......... B29C 65/0672 |
| JP | 2002504980 | A | | 2/2002 |
| JP | 3547764 | B2 | | 7/2004 |
| JP | 2011506867 | A | | 3/2011 |
| JP | 2013029169 | A | | 2/2013 |
| WO | WO-2015164704 | A1 | * | 10/2015 ....... B29C 66/12463 |

OTHER PUBLICATIONS

Japanese Office Action for Japanese Application No. 2020-512381 dated Apr. 13, 2021 (4 pages).
English Translation of Japanese Office Action for Japanese Application No. 2020-512381 dated Apr. 13, 2021 (5 pages).
Korean Office Action for Korean Application No. 10-2020-7004625 dated Mar. 31, 2021 (8 pages).
English Translation of Korean Office Action for Korean Application No. 10-2020-7004625 dated Mar. 31, 2021 (8 pages).
First German Office Action for German Application No. 102017120305.2 dated Sep. 14, 2017 (4 pages).
International Search Report for International Application No. PCT/EP2018/073038 dated Nov. 16, 2018 (4 pages).
English Translation of International Search Report for International Application No. PCT/EP2018/073038 dated Nov. 16, 2018 (2 pages).
EP Office Action for EP Application No. 18 762 811.0 dated Aug. 20, 2021 (6 pages).
Korean Office Action for Korean Application No. 10-2020-7004625 dated Oct. 27, 2021 (57 pages).
English Translation of Korean Office Action for Korean Application No. 10-2020-7004625 dated Oct. 27, 2021 (8 pages).

* cited by examiner

PIPE DEVICE HAVING A BONDED JOINT

The disclosure relates to a pipe device.

Pipe devices are known from the prior art which comprise a pipe or a pipeline and a connecting member. The connecting member serves to connect the pipe to a connection object, such as, for example, a further pipe, a vessel, a housing, a pump or the like. The connection between the pipe and the connecting member is in most cases not designed for repeated removal. The other end of the connecting member, on the other hand, in most cases serves to provide a connection which is quick and simple and also removable.

Such a pipe device is described, for example, in DE 20 2009 000 328 U1. It is provided therein to push the pipe onto a connection piece of the connecting member. Peripheral holding lugs on the connection piece prevent the pipe from slipping off the connection piece once it has been pushed on. In addition, the connecting member has, at the end that is remote from the connection piece, a mechanical coupling element for interlocking connection with a connection object.

It may be a disadvantage of this configuration that the connection between the pipe and the connecting member can absorb only moderate tensile forces, can transmit only small torsional moments, and leakages can occur. It may therefore be necessary to use auxiliary elements, such as clamps, which are expensive and complex to fit, to increase the tightness and the tensile and torsional strength, but such elements can only partly remedy the problems.

SUMMARY

Accordingly, one object of the disclosure according to an embodiment is to overcome the disadvantages of the prior art and to develop a pipe device which has high tightness and withstands high tensile and torsional forces. The pipe device may additionally be easy to handle, durable and inexpensive.

In a pipe device having, or a pipe connection between, a pipe and a connecting member, wherein the pipe has a pipe jacket with an inner surface and an outer surface and forms a flow channel, wherein the connecting member forms a through-channel which extends from a connection piece made of a first material and having a first opening to a second opening, and wherein the pipe jacket is seated with a first pipe end made of a second material on the connection piece, the disclosure provides, per an embodiment, that there is formed in a contact zone between the inner surface of the pipe jacket and a peripheral surface of the connection piece a bonded connection between the first material and the second material, in particular a joint, and in particular directly between the first material and the second material.

Advantages of a bonded connection according to some embodiments are high tensile strength, high torsional strength and low leakage rates between the connecting member and the pipe.

Pipes are to be understood in particular as being elongate hollow bodies which can be inflexible or flexible to tube-like.

It is possible in principle that the connecting member consists of the first material and/or that the pipe consists of the second material. However, forms are also possible in which the pipe and/or the connecting member comprise other materials away from the contact zone.

According to an embodiment, the bonded connection is liquid-tight and/or gas-tight or fluid-tight, and further, no additional sealing elements are arranged or formed between the pipe and the connecting member. As a result, the manufacturing costs are low.

According to the disclosure, the first material and the second material can be the same or different. There are suitable as the first material, for example, PA 666, PA 66, PPA and PA 12. There come into consideration as the second material, for example, PPA and PA 12.

According to an embodiment, the first pipe end of the pipe jacket abuts a stop of the connection piece. As a result, fitting can be carried out reliably and longitudinal compression of the first pipe end during fitting is possible.

In an embodiment, the connection piece comprises a stop, and the first material of the stop is connected to the second material of the first pipe end by a bonded connection. As a result, the area of the possible bonded connection is increased and a high tensile strength, a high torsional strength and low leakage rates can be achieved.

In an optional configuration, the connection piece comprises a peripheral collar, wherein there is formed between the peripheral collar and the peripheral surface of the connection piece an annular gap into which the first pipe end projects. For this purpose, the annular gap should be configured to be open in the longitudinal direction and also in the direction of the pipe jacket. The annular gap can then also be referred to as an annular groove. By means of the peripheral collar it is possible to compress the bonded connection, for example a weld, in the annular gap, which leads to an increase in strength. In addition, the peripheral collar prevents molten material from overflowing outwards in the case of melting of the first and/or second material. The pipe device thus looks technically clean and satisfies aesthetic demands.

The annular gap, per an embodiment, is wider than the wall thickness of the first pipe end before it is pushed onto the peripheral surface of the connection piece, wherein the wall thickness in the case of a corrugated inner surface and/or corrugated outer surface of the pipe jacket is determined from the smallest inside diameter to the largest outside diameter. The peripheral collar is thus at first not an obstacle when the pipe end is being pushed onto the connection piece.

According to an optional embodiment, the first material of the peripheral collar is connected to the second material of the first pipe end by a bonded connection. As a result, the area of the possible bonded connection is increased and a high tensile strength, a high torsional strength and low leakage rates can be achieved.

It may be expedient to form the peripheral collar with a substantially cylindrical inner surface. As a result, simple demolding or production of the annular gap is possible. The term "substantially" is to include at least draft angles and lead-in chamfers.

Furthermore, one or more holes can be formed in the peripheral collar, wherein the holes may be distributed over the periphery of the peripheral collar. As a result, air or gases can escape from the annular gap on insertion of the pipe end into the annular gap.

According to an embodiment, the bonded connection (or the bonded connections or connection regions) between the first material and the second material are formed by melting and curing the first material and/or by melting and curing the second material. This produces a stable connection. It is possible, for example, to melt only one material and allow it to seep into the other component, that is to say the pipe or the connecting member, in order to achieve adhesion in combination with a bonded connection. Joining variants are additionally possible in which the first material and the second material in the bonded connection (or in the bonded connections or connection regions) have penetrated one another and/or diffused into one another and/or mixed with one another. A particularly firm and tight connection, according to an embodiment, is obtained when the first and the second material are melted and cured at the same time.

In an embodiment, the bonded connection between the first material and the second material is produced by spin welding. This is inexpensive and reliable. The use of spin welding can be detected in the product by winding microstructures in the joint zone. Spin welding is to be understood as meaning the joining of a first, preferably rotationally symmetrical object to a second, preferably rotationally symmetrical object, wherein a relative rotation between the first and second object is carried out during joining. In most cases, only one of the two objects is rotated for this purpose and the other object is not rotated. During the relative rotation, friction and thus frictional heat is generated between the first and second object, which leads to melting. The frictional heat generated can additionally be significantly influenced by compressive forces between the two objects. For curing, the relative rotation is stopped. Curing can be accelerated by cooling measures. In an embodiment, it is preferred to fix the pipe in position and to rotate the connecting member.

In an embodiment of the pipe device, the first pipe end of the pipe jacket had a cylindrical inner surface and a cylindrical outer surface before it was pushed onto the peripheral surface of the connection piece. This form is thus intended in particular for the use of smooth pipes or at least a smooth pipe connection piece.

An increase in the strength of the connection can here be achieved in particular in that the first pipe end of the pipe jacket has been turned down as a result of being pushed onto the connection piece and optionally striking the stop of the connection piece. Turning down increases the contact area and thus the area of the bonded connection. A bonded connection with the optional peripheral collar can also be achieved by turning down.

In an embodiment, the first pipe end of the pipe jacket had a corrugated inner surface and/or a corrugated outer surface before it was pushed onto the peripheral surface of the connection piece. This form is thus intended in particular for the use of corrugated pipes without smooth pipe connection pieces, which have a higher bending elasticity than smooth pipes.

In principle, other pipe forms also come into consideration in these embodiments. For example, the pipe jacket can have a cylindrical inner surface and/or a cylindrical outer surface adjacent to the first pipe end, or the pipe jacket has a corrugated inner surface and/or a corrugated outer surface adjacent to the first pipe end. Connection is thus also possible in the case of smooth pipes which have a first pipe end in the form of a corrugated pipe, and in the case of corrugated pipes which have a first pipe end with a cylindrical smooth pipe connection piece.

The greatest economic advantages, according to an embodiment, are achieved if endlessly extruded corrugated pipes without smooth regions are used. In this embodiment, it is additionally possible to merge into a pipe bend of the pipe directly after the connecting member. Less installation space is thus called for.

In the case of corrugated pipes, peaks and troughs are formed by the pipe jacket on the inner surface and/or the outer surface. Such a pipe can be cut to any desired length and connected to the connecting member.

According to an embodiment of the pipe device, the corrugated inner surface and/or the corrugated outer surface have shortened peak distances and/or trough distances at the first pipe end after it has been pushed onto the peripheral surface (of the connection piece). These are the result of compression of the corrugated pipe as it is pushed on. The contact area for forming the bonded connection is thereby increased. In combination with an optional peripheral collar, the compression can be used to bring the outer peaks into contact with the inner side of the peripheral collar. This increases the pressure in the region of the peripheral surface, which has a positive effect in particular in the case of optional spin welding, because more frictional heat is thereby generated. In addition, the pressure can be sufficient also to form a bonded connection between the inner side of the peripheral collar and the first pipe end in the case of optional spin welding.

Furthermore, it is provided in an embodiment that at least a portion of the peripheral surface of the connection piece widens, starting from a first opening and as the distance from the first opening increases, from a minimum diameter to a maximum diameter. On the one hand, simple fitting of the pipe is thereby made possible by a lead-in chamfer. In addition, a compressive force can also be applied to the inner wall of the pipe jacket by means of the lead-in chamfer. This increases the tightness and, in the case of optional spin welding, allows the frictional heat to be increased as a result of the radial stress in the pipe jacket. This can be achieved in particular with a specific form in which the minimum diameter is smaller than and the maximum diameter is larger than the diameter of the inner surface of the pipe jacket.

Depending on the site of use, and according to embodiments, forms of the connecting member come into consideration in which the through-channel between the first and second opening of the connecting member is straight or has a change of direction of preferably at least 10 degrees and preferably not more than 180 degrees. Changes of direction of less than 10 degrees are preferably formed by bending the pipe behind the connection piece. Therefore, specially prepared connecting members tend not to be necessary for such small changes of direction.

In an embodiment, the connecting member comprises, in the region of the second opening, a coupling element for the interlocking attachment of a connection object. By means of the connecting member, the pipe can thus be connected in a simple manner to a connection object such as, for example, a further pipe, a vessel, a housing, a pump or the like. The coupling element may comprise a latching element. A simple and secure connection is thereby possible. In order to achieve a liquid-tight and/or gas-tight or fluid-tight and releasable connection, a sealing ring can be arranged and/or a sealing surface can be formed in the region of the second opening. Simple fitting is possible, for example, if the connecting member is in the form of a plug or plug-type coupling in the region of the second opening.

BRIEF DESCRIPTION OF THE FIGURES

Further features, details and advantages of the disclosure will become apparent from the wording of the claims and from the following description of exemplary embodiments with reference to the drawings, in which:

DETAILED DESCRIPTION

Figure 1:
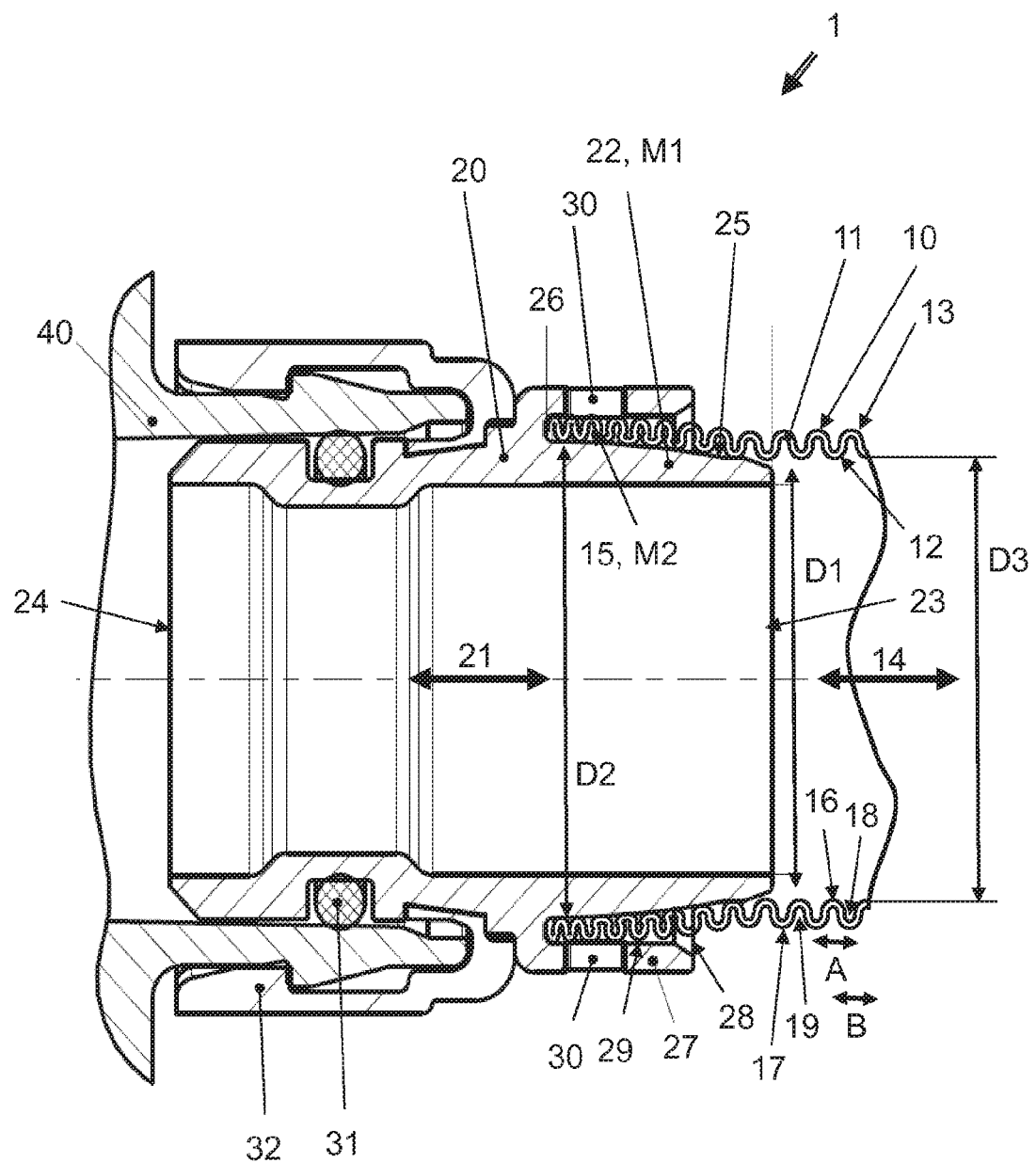
FIG. 1 shows a longitudinal section through a pipe device having a corrugated pipe without a smooth end-piece and a connecting member.
Figure 2:
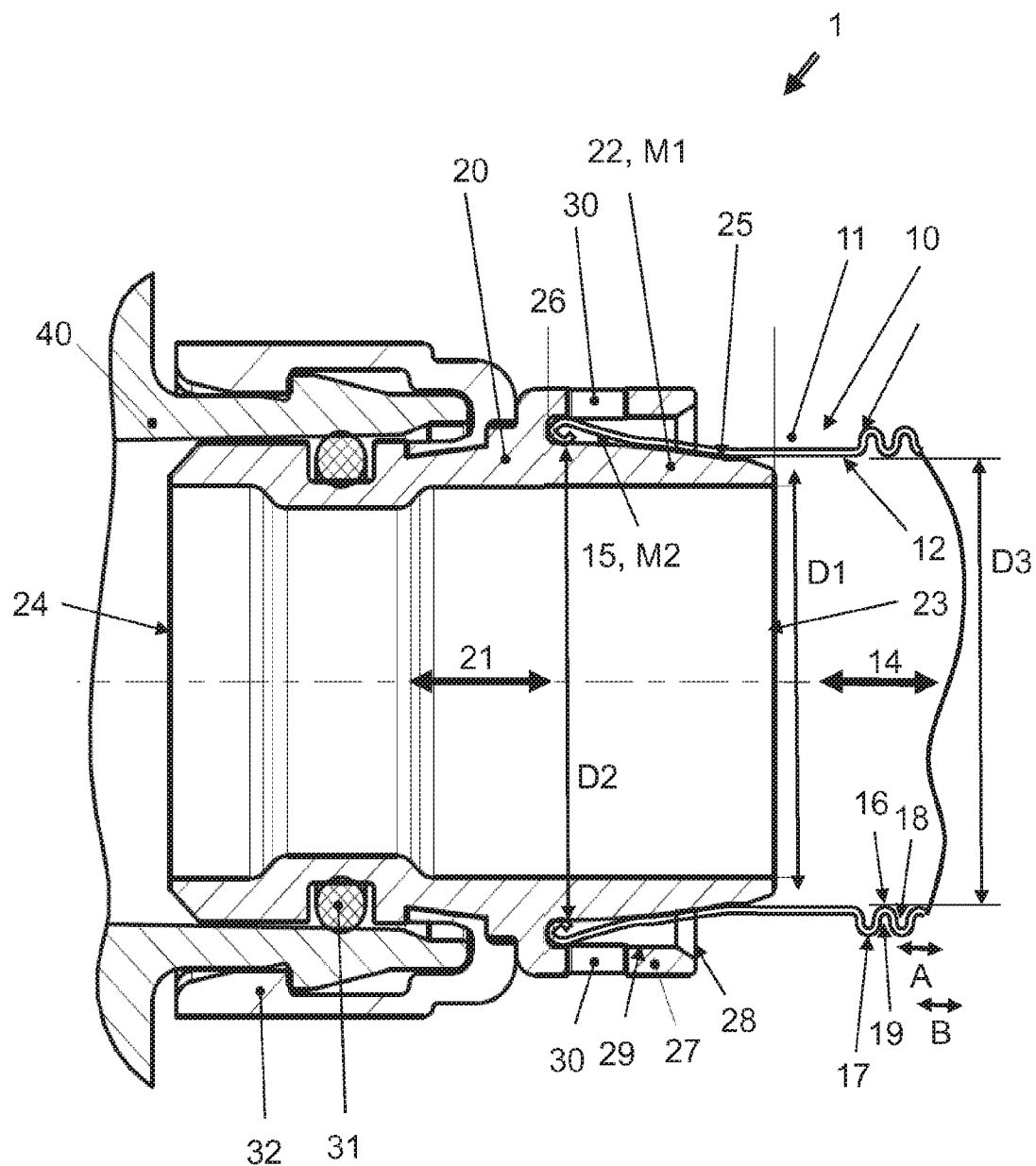
FIG. 2 shows a longitudinal section through a pipe device having a corrugated pipe with a smooth end-piece and a connecting member.

FIGS. 1 and 2 each show in a longitudinal section a pipe device 1 having (or a pipe connection between) a pipe 10, which is a corrugated pipe, and a connecting member 20. The connecting member 20 is additionally shown in a perspective view in FIG. 3.

Figure 3:
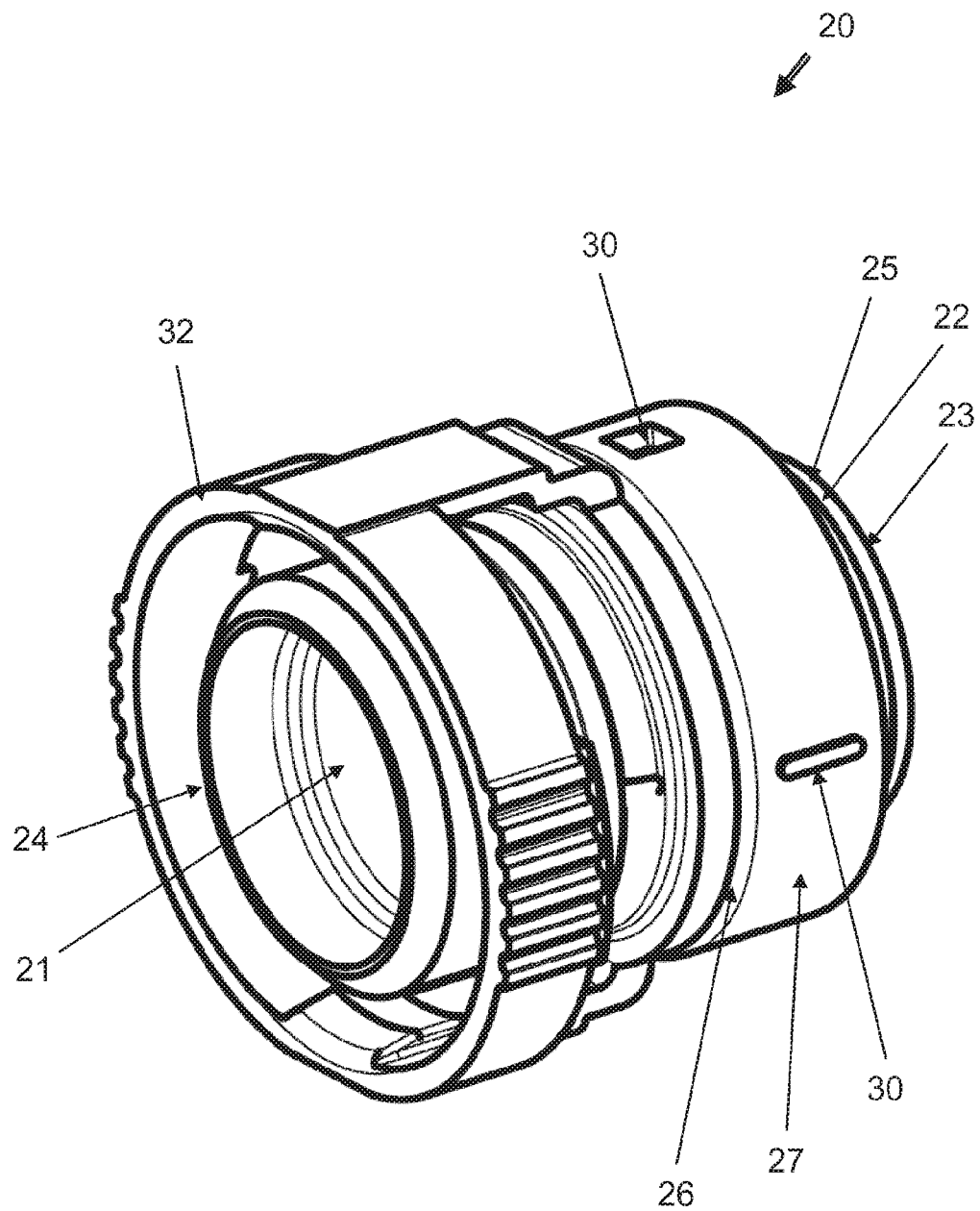
FIG. 3 is a perspective view of a connecting member.

The connecting member 20 according to FIGS. 1, 2 and 3 forms a through-channel 21 which extends from a connection piece 22 having a first opening 23 to a second opening 24. The through-channel 21 is straight, that is to say it does not make any change of direction. The connection piece 22 forms a peripheral surface 25 and has a stop 26 and a peripheral collar 27. Between the peripheral collar 27 and the peripheral surface 25 of the connection piece 22 there is formed an annular gap 28. The annular gap 28 is open in the longitudinal direction of the through-channel 21 and also in the direction of the first opening 23. The peripheral collar 27 has a cylindrical inner surface 29 and a lead-in chamfer. In addition, holes 30 are formed in the peripheral collar 27, which holes are distributed over the periphery of the peripheral collar 27. As can be seen in particular in FIG. 3, the holes 30 have different shapes. A portion of the peripheral surface 25 of the connection piece 22 widens, starting from the first opening 23 and as the distance from the first opening 23 increases, from a minimum diameter D1 to a maximum diameter D2.

Furthermore, the connecting member 20 has a coupling element 32 in the region of the second opening 24 for the interlocking attachment of a connection object 40. As can be seen in FIGS. 1 and 2, the coupling element 32 and the connection object 40 each have undercuts, which are in engagement with one another. The fixing can be locked and released by latching fixing ring of the connecting member 20. In the region of the second opening 24, the connecting member 20 forms a seal seat, in which a sealing ring 31 is arranged. The sealing ring corresponds to a sealing surface of the connection object 40. The connecting member 20 projects with the region of the second opening 24 into the connection object 40 and can therefore be referred to as a plug.

The pipe 10 is shown only in FIGS. 1 and 2 but not in FIG. 3. It has a pipe jacket 11 with an inner surface 12 and an outer surface 13 and forms a flow channel 14. The pipe jacket 11 forms a first pipe end 15 which is seated on the connection piece 22 of the connecting member 20. The first pipe end 15 thereby projects into the annular gap 28 between the peripheral collar 27 and the peripheral surface 25 of the connection piece 22.

The connection piece 22 and also the remainder of the connecting member 20 are made of a first material M1, and the first pipe end 15 and the remainder of the pipe jacket 11 are made of a second material M2. In a contact zone between the inner surface 12 of the pipe jacket 11 and the peripheral surface 25 of the connection piece 22 there is formed a bonded connection between the first material M1 and the second material M2, that is to say without additional materials such as adhesive or the like. The first material M1 and the second material M2 can be the same or different. The connection piece 22 and the first pipe end 15 are joined and not formed in one piece.

The first pipe end 15 of the pipe jacket 11 abuts the stop 26 of the connection piece 22. The first material M1 of the stop 26 and the second material M2 of the first pipe end 15 are connected by a bonded connection here too. In addition, the first material M1 of the peripheral sleeve 27 is connected to the second material M2 of the first pipe end 15 by a bonded connection.

As a result of the bonded connection there is formed a connection which has tensile strength, is rotationally fixed and is liquid-tight and/or gas-tight or fluid-tight. Nor are any additional sealing elements arranged or formed between the pipe 10 and the connecting member 20.

The bonded connection (or the bonded connections or connection regions) between the first material M1 and the second material M2 can be produced by melting and curing the first material M1 and/or by melting and curing the second material M2. This is carried out according to an embodiment by spin welding. For this purpose, the peripheral surface 25 is of rotationally symmetrical form and the first pipe end 15 is round. In addition, the annular gap 28 is wider than the wall thickness of the first pipe end 15 before it is pushed onto the peripheral surface 25 of the connection piece 22. In the case of a corrugated inner surface 12 and a corrugated outer surface 13 of the pipe jacket 11 according to FIG. 1, the wall thickness is determined from the smallest inside diameter to the largest outside diameter. The minimum diameter D1 of the peripheral surface 25 is smaller than and the maximum diameter D2 of the peripheral surface 25 is larger than the minimum diameter D3 of the inner surface 12 of the pipe jacket 11. As a result, the first pipe end 15 is widened as it is pushed onto the connection piece 22 and with a relative rotation of the pipe 10 relative to the connecting member 20. This increases the radial stress in the pipe jacket 11 and the frictional heat in the contact zone with the peripheral surface 25. In this embodiment, the pipe 10 is rotationally fixed and the connecting member 20 is rotated. By means of the frictional heat, the first material M1 and/or the second material M2 are melted.

As soon as the first pipe end 15 strikes the stop 26 as it is being pushed on, the first pipe end 15 is compressed. As a result, the first pipe end 15 also comes into contact with the inner surface 29 of the peripheral collar 27 and frictional heat is generated, which can be used to melt the first and/or second material M1, M2.

As soon as the relative rotation is stopped, the first material M1 and the second material M2 begin to solidify and the bonded connection forms.

According to FIG. 1, the first pipe end 15 of the pipe jacket 11 had a corrugated inner surface 12 and a corrugated outer surface 13 before it was pushed onto the peripheral surface 25 of the connection piece 22. In particular, the pipe jacket 11 as a whole is a corrugated pipe with peaks 16, 17 and troughs 18, 19 on the inner surface 12 and the outer surface 13. Away from the contact zone, the pipe jacket 11 retains defined peak distances A between the peaks 16, 17 and trough distances B between the troughs 18, 19 even after fitting. On the other hand, the corrugated inner surface 12 and the corrugated outer surface 13 have shortened peak distances A and trough distances B at the first pipe end 15 after it has been pushed on. The peaks 16, 17 and troughs 18, 19 are compressed, as it were, in the manner of a harmonica. If there is sufficient frictional heat, a bonded connection is thereby also produced between the flanks of the peaks 16, 17, that is to say between different regions made of the second material M2.

In the embodiment according to FIG. 2, the first pipe end 15 of the pipe jacket 11 had a cylindrical inner surface 12 and a cylindrical outer surface 13 before it was pushed onto the peripheral surface 25 of the connection piece 22. The first pipe end 15 has deformed as a result of being pushed on and heated. It widens over a first portion lying against the peripheral surface 25, lifts away from the peripheral surface 25 in a second portion and is then turned inwards or turned in at the end of the first pipe end 15 against the stop 26 of the connection piece 22.

Adjacent to the first pipe end 15, the pipe jacket 11 has a corrugated inner surface 12 and a corrugated outer surface 13. In particular, it is a corrugated pipe which has a smooth terminal connection piece at the end. The peaks 16, 17 have a defined peak distance A and the troughs 18, 19 have a defined trough distance B.

The invention is not limited to one of the above-described embodiments but can be modified in many different ways. All the features and advantages which follow from the claims, the description and the drawing, including structural details, spatial arrangements and method steps, can be fundamental to the invention both on their own and in very different combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

| List of reference numerals | |
|---|---|
| 1 | pipe device |
| 10 | pipe |
| 11 | pipe jacket |
| 12 | inner surface (pipe jacket) |
| 13 | outer surface (pipe jacket) |
| 14 | flow channel |
| 15 | first pipe end |
| 16 | peak (inner surface) |
| 17 | peak (outer surface) |
| 18 | trough (inner surface) |
| 19 | trough (outer surface) |
| 20 | connecting member |
| 21 | through-channel |
| 22 | connection piece |
| 23 | first opening |
| 24 | second opening |
| 25 | peripheral surface (connection piece) |
| 26 | stop (connection piece) |
| 27 | peripheral collar |
| 28 | annular gap |
| 29 | inner surface (peripheral collar) |
| 30 | hole |
| 31 | sealing ring |
| 32 | coupling element |
| 40 | connection object |
| A | peak distance |
| B | trough distance |
| D1 | minimum diameter (peripheral surface) |
| D2 | maximum diameter (peripheral surface) |
| D3 | diameter (inner surface of the pipe jacket) |
| M1 | first material (connection piece) |
| M2 | second material (first pipe end) |

The invention claimed is:

1. A pipe device comprising a pipe and a connecting member,
wherein the pipe comprises a pipe jacket with an inner surface and an outer surface and forms a flow channel,
wherein the connecting member forms a through-channel which extends from a connection piece made of a first material (M1) and having a first opening to a second opening,
wherein the pipe jacket is seated with a first pipe end made of a second material (M2) on the connection piece, and
wherein there is formed in a contact zone between the inner surface of the pipe jacket and a peripheral surface of the connection piece a bonded connection between the first material (M1) and the second material (M2);
wherein the first pipe end of the pipe jacket had a corrugated inner surface and/or a corrugated outer surface before it was pushed onto the peripheral surface of the connection piece;
wherein the corrugated inner surface and/or the corrugated outer surface has shortened peak distances (A) and/or trough distances (B) at the first pipe end after it has been pushed onto the peripheral surface of the connection piece;
wherein the connection piece comprises a peripheral collar;
wherein the peripheral collar comprises one or more holes distributed over the periphery of the peripheral collar and the shortened peak distances (A) and/or trough distances (B); and wherein the bonded connection between the first material (M1) and the second material (M2) is produced by spin welding.

2. The pipe device as claimed in claim 1, wherein the connection piece comprises a stop, and the first material (M2) of the stop is connected to the second material (M2) of the first pipe end by a bonded connection.

3. The pipe device as claimed in claim 1, wherein there is formed between the peripheral collar and the peripheral surface of the connection piece an annular gap into which the first pipe end projects.

4. The pipe device as claimed in claim 3, wherein the first material (M1) of the peripheral collar is connected to the second material (M2) of the first pipe end by a bonded connection.

5. The pipe device as claimed in claim 1, wherein the bonded connection between the first material (M1) and the second material (M2) is formed by melting and curing the first material (M1) and/or by melting and curing the second material (M2).

6. The pipe device as claimed in claim 1, wherein the first pipe end of the pipe jacket had a cylindrical inner surface and a cylindrical outer surface before it was pushed onto the peripheral surface of the connection piece.

7. The pipe device as claimed in claim 1, wherein at least a portion of the peripheral surface of the connection piece widens, starting from the first opening and as the distance from the first opening increases, from a minimum diameter (D1) to a maximum diameter (D2).

8. The pipe device as claimed in claim 7, wherein the minimum diameter (D1) is smaller than and the maximum diameter (D2) is larger than a diameter (D3) of the inner surface of the pipe jacket.

9. The pipe device as claimed in claim 1, wherein the through-channel, between the first and second opening of the connecting member, is straight or has a change of direction of at least 10 degrees and less than 180 degrees.

10. The pipe device as claimed in claim 1, wherein the connecting member has in the region of the second opening a coupling element for an interlocking attachment of a connection object.

* * * * *